(12) United States Patent
Arai (10) Patent No.: US 11,144,295 B2
(45) Date of Patent: Oct. 12, 2021

(54) PROGRAM UPDATING SYSTEM, PROGRAM UPDATING METHOD, AND COMPUTER PROGRAM

(71) Applicant: Sumitomo Electric Industries, Ltd., Osaka (JP)

(72) Inventor: Koji Arai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/080,846

(22) PCT Filed: Oct. 11, 2016

(86) PCT No.: PCT/JP2016/080065
§ 371 (c)(1),
(2) Date: Aug. 29, 2018

(87) PCT Pub. No.: WO2017/149824
PCT Pub. Date: Sep. 8, 2017

(65) Prior Publication Data
US 2019/0087169 A1    Mar. 21, 2019

(30) Foreign Application Priority Data

Mar. 2, 2016   (JP) .............................. JP2016-039917

(51) Int. Cl.
*G06F 8/65*      (2018.01)
*G06F 9/445*     (2018.01)
(Continued)

(52) U.S. Cl.
CPC ................ *G06F 8/65* (2013.01); *B60R 16/02* (2013.01); *G06F 9/445* (2013.01); *G06F 11/00* (2013.01);
(Continued)

(58) Field of Classification Search
CPC ............ G06F 8/654; G06F 8/65; G06F 8/658; H04W 4/48; H04W 4/44
See application file for complete search history.

(56) References Cited

U.S. PATENT DOCUMENTS 5,878,228 A    3/1999   Miller
6,009,468 A   12/1999   Lau
(Continued)

FOREIGN PATENT DOCUMENTS

CN      102193808 A     9/2011
CN      102223256 A    10/2011
(Continued)

OTHER PUBLICATIONS

U.S. Appl. No. 16/080,760, filed Aug. 29, 2018 [Related Application; Provided in IFW].
(Continued)

*Primary Examiner* — S. Sough
*Assistant Examiner* — Cheneca Smith
(74) *Attorney, Agent, or Firm* — Baker Botts L.L.P.; Michael A. Sartori (57) ABSTRACT

A system according to one aspect of the present disclosure is a program updating system including: a plurality of control devices installed in a vehicle; and a gateway connected to the plurality of control devices so as to be communicable with the control devices within the vehicle. The gateway includes: a wireless communication unit configured to wirelessly receive a plurality of update programs for the control devices; a storage unit configured to store therein the received plurality of update programs; an in-vehicle communication unit configured to transmit the stored plurality of update programs to the corresponding control devices, respectively; and a processing unit configured to execute sequential reception of the update programs
(Continued)

in accordance with a communication status of wireless communication, when a total amount of data of the plurality of update programs exceeds a memory capacity of the storage unit.

6 Claims, 5 Drawing Sheets

(51) Int. Cl.
*G06F 13/00* (2006.01)
*G06F 11/00* (2006.01)
*B60R 16/02* (2006.01)
*H04W 4/44* (2018.01)
*H04L 29/08* (2006.01)
*B60R 16/023* (2006.01)
*B60W 50/00* (2006.01)

(52) U.S. Cl.
CPC ............. *G06F 13/00* (2013.01); *H04L 67/34* (2013.01); *H04W 4/44* (2018.02); *B60R 16/0231* (2013.01); *B60W 50/00* (2013.01); *B60W 2050/0077* (2013.01); *B60W 2050/0083* (2013.01)

(56) References Cited

U.S. PATENT DOCUMENTS

| | | |
|---|---|---|
| 6,553,237 B1 | 4/2003 | Cantwell |
| 7,006,820 B1 | 2/2006 | Parker et al. |
| 8,036,690 B1 | 10/2011 | Delker |
| 8,065,673 B2 | 11/2011 | D'Souza et al. |
| 8,086,093 B2 | 12/2011 | Stuckman |
| 8,201,164 B2 | 6/2012 | Reus et al. |
| 8,321,858 B1 | 11/2012 | Marmaros et al. |
| 8,612,619 B2 | 12/2013 | Guo |
| 8,819,303 B2 | 8/2014 | Venugopal et al. |
| 8,892,720 B2 | 11/2014 | Diaz |
| 9,086,941 B1 | 7/2015 | Siegel |
| 9,161,258 B2 | 10/2015 | Wendling et al. |
| 9,336,178 B2 | 5/2016 | Haas |
| 9,720,680 B2* | 8/2017 | Diedrich .................. G06F 8/65 |
| 9,826,060 B1 | 11/2017 | Johansson |
| 9,904,531 B2 | 2/2018 | Suzuki et al. |
| 9,946,531 B1 | 4/2018 | Fields et al. |
| 10,048,700 B1 | 8/2018 | Curlander et al. |
| 10,279,757 B2 | 5/2019 | Netter |
| 2002/0110149 A1 | 8/2002 | Roberts |
| 2004/0002367 A1 | 1/2004 | Chanut |
| 2004/0073361 A1 | 4/2004 | Tzamaloukas |
| 2006/0248162 A1* | 11/2006 | Kawasaki ................ G06F 8/65 709/217 |
| 2007/0002863 A1 | 1/2007 | Black |
| 2007/0091836 A1 | 4/2007 | Oprescu-Surcobe |
| 2008/0049787 A1 | 2/2008 | McNaughton |
| 2008/0065816 A1* | 3/2008 | Seo ......................... G06F 13/00 711/103 |
| 2008/0242280 A1 | 10/2008 | Shapiro |
| 2009/0187899 A1 | 7/2009 | Mani |
| 2009/0213871 A1 | 8/2009 | Carlson |
| 2009/0271778 A1 | 10/2009 | Mandyam et al. |
| 2009/0300595 A1 | 12/2009 | Moran et al. |
| 2010/0002582 A1 | 1/2010 | Luft |
| 2010/0011090 A1 | 1/2010 | Gordon |
| 2010/0205318 A1 | 8/2010 | Melnyk |
| 2011/0010703 A1 | 1/2011 | Matsuda |
| 2011/0271275 A1 | 11/2011 | Ochi et al. |
| 2011/0307882 A1 | 12/2011 | Shiba |
| 2011/0314107 A1 | 12/2011 | Garcia |
| 2012/0095670 A1 | 4/2012 | Piggott |
| 2012/0257560 A1 | 10/2012 | Srinivasan et al. |
| 2012/0278439 A1 | 11/2012 | Ahiska et al. |
| 2013/0096737 A1 | 4/2013 | Suganuma et al. |
| 2013/0114422 A1 | 5/2013 | Clark |
| 2013/0198732 A1* | 8/2013 | Fujita ....................... G06F 8/65 717/170 |
| 2014/0045481 A1 | 2/2014 | Fraley |
| 2014/0068059 A1 | 3/2014 | Cole |
| 2014/0109075 A1 | 4/2014 | Hoffman et al. |
| 2014/0149974 A1 | 5/2014 | Banks et al. |
| 2014/0237465 A1 | 8/2014 | Lin |
| 2014/0242916 A1 | 8/2014 | Bellamkonda |
| 2014/0282470 A1* | 9/2014 | Buga ........................ G06F 8/65 717/170 |
| 2014/0304700 A1* | 10/2014 | Kim .......................... G06F 8/65 717/173 |
| 2015/0052512 A1* | 2/2015 | Kostadinov .............. G06F 8/65 717/173 |
| 2015/0113521 A1 | 4/2015 | Suzuki et al. |
| 2015/0128123 A1 | 5/2015 | Eling |
| 2015/0169311 A1 | 6/2015 | Dickerson et al. |
| 2015/0215738 A1 | 7/2015 | Frusinia |
| 2015/0237089 A1 | 8/2015 | Hinohara |
| 2015/0309784 A1 | 10/2015 | Molin et al. |
| 2015/0358198 A1 | 12/2015 | Mahajan |
| 2016/0021190 A1 | 1/2016 | Vuyyuru |
| 2016/0065485 A1 | 3/2016 | Wolcott |
| 2016/0196128 A1 | 7/2016 | Wang et al. |
| 2016/0266890 A1 | 9/2016 | Aleksandrov et al. |
| 2016/0316388 A1 | 10/2016 | Rosen et al. |
| 2016/0378454 A1 | 12/2016 | Nekrestyanov |
| 2017/0024201 A1* | 1/2017 | Diedrich ................... G06F 8/65 |
| 2017/0026492 A1 | 1/2017 | Kawamura et al. |
| 2017/0347236 A1 | 11/2017 | Frusina |
| 2018/0027039 A1 | 1/2018 | Moorthy |
| 2018/0121185 A1 | 5/2018 | Yoshitomi et al. |
| 2018/0255175 A1 | 9/2018 | Tran et al. |
| 2018/0272964 A1 | 9/2018 | Netter |
| 2018/0293059 A1 | 10/2018 | Armand et al. |
| 2019/0258467 A1 | 8/2019 | Frantz et al. |

FOREIGN PATENT DOCUMENTS

| | | |
|---|---|---|
| JP | H05-195859 A | 8/1993 |
| JP | 2000-347957 A | 12/2000 |
| JP | 2001-296994 A | 10/2001 |
| JP | 2003-065788 A | 3/2003 |
| JP | 2003-076567 A | 3/2003 |
| JP | 2004-206390 A | 7/2004 |
| JP | 2004-247951 A | 9/2004 |
| JP | 2005-026731 A | 1/2005 |
| JP | 2005-078324 A | 3/2005 |
| JP | 2005-122367 A | 5/2005 |
| JP | 2005-349878 A | 12/2005 |
| JP | 2006-020228 A | 1/2006 |
| JP | 2006-298260 A | 11/2006 |
| JP | 2007-034815 A | 2/2007 |
| JP | 2007-065856 A | 3/2007 |
| JP | 2007-166593 A | 6/2007 |
| JP | 2008-204042 A | 9/2008 |
| JP | 2009-002195 A | 1/2009 |
| JP | 2010-198155 A | 9/2010 |
| JP | 2011-033361 A | 2/2011 |
| JP | 2011-053954 A | 3/2011 |
| JP | 2011-079486 A | 4/2011 |
| JP | 2011-121396 A | 6/2011 |
| JP | 2013-009298 A | 1/2013 |
| JP | 2013-011927 A | 1/2013 |
| JP | 2013-148387 A | 8/2013 |
| JP | 2013-181908 A | 9/2013 |
| JP | 2013-206075 A | 10/2013 |
| JP | 2014-106875 A | 6/2014 |
| JP | 2015-041231 A | 3/2015 |
| JP | 2015-079468 A | 4/2015 |
| JP | 2015-085901 A | 5/2015 |
| JP | 2015-153252 A | 8/2015 |
| JP | 2015-191502 A | 11/2015 |
| JP | 2016-004514 A | 1/2016 |
| JP | 2016-038634 A | 3/2016 |
| WO | 2010/113348 A1 | 10/2010 |
| WO | 2011/007413 A1 | 1/2011 |
| WO | 2011/135629 A1 | 11/2011 |

(56) References Cited

FOREIGN PATENT DOCUMENTS

| WO | 2015/159815 A1 | 10/2015 |
|---|---|---|
| WO | 2015/166721 A1 | 11/2015 |
| WO | 2016/080452 A1 | 5/2016 |

OTHER PUBLICATIONS

U.S. Appl. No. 16/080,739, filed Aug. 29, 2018 [Related Application; Provided in IFW].
U.S. Appl. No. 16/306,209, filed Nov. 30, 2018 [Related Application; Provided in IFW].
Non-Final Office Action in U.S. Appl. No. 16/080,739, dated Aug. 22, 2019.
Non-Final Office Action in U.S. Appl. No. 16/080,760, dated Jun. 27, 2019.
A. Bohm and M. Jonsson, "Position-Based Data Traffic Prioritization in Safety-Critical, Real-Time Vehicle to Infrastructure Communication," 2009 IEEE International Conference on Communications Workshops, Dresden, 2009, pp. 1-6 (Year: 2009).
I. Hossain and S. M. Mahmud, "Analysis of a Secure Software Upload Technique in Advanced Vehicles Using Wireless Links," 2007 IEEE Intelligent Transportation Systems Conference, Seattle, WA, 2007, pp. 1010-1015 (Year: 2007).
M. Hu, J. Luo, Y. Wang, M. Lukasiewycz and Z. Zeng, "Holistic Scheduling of Real-Time Applications in Time-Triggered In-Vehicle Networks," in IEEE Transactions on Industrial Informatics, vol. 10, No. 3, pp. 1817-1828, Aug. 2014. (Year: 2014).
Y. Lee and K. Park, "Meeting the real-time constraints with standard Ethernet in an in-vehicle network," 2013 IEEE Intelligent Vehicles Symposium (IV), Gold Coast, QLD, 2013, pp. 1313-1318. (Year: 2013).
Y.S. Lee, J.H. Kim, H.V. Hung and J.W. Jeon, "A parallel reprogramming method for in-vehicle gateway to save software update time," 2015 IEEE International Conference on Information and Automation, Lijiang, 2015, pp. 1497-1502. (Year: 2015).
S.M. Mahmud, S. Shanker and I. Hossain, "Secure software upload in an intelligent vehicle via wireless communication links," IEEE Proceedings. Intelligent Vehicles Symposium, 2005, Las Vegas, NV, USA, 2005, pp. 588-593. (Year: 2005).
L. Mu and A. Prinz, "Delay-oriented data traffic migration in maritime mobile communication environments," 2012 Fourth International Conference on Ubiquitous and Future Networks (ICUFN), Phuket, 2013, pp. 417-422. (Year 2012).
Qian et al., "Performance evaluations on a bandwidth on demand algorithm for a high capacity multimedia satellite network," 2000 IEEE International Conference on Communications. ICC 2000. Global Convergence Through Communications. Conference Record. New Orleans, LA, USA, 2000, pp. 139-143 vol. 1. (Year: 2000).
Non-Final Office Action tn U.S. Appl. No. 16/080,760, dated Apr. 30, 2020.
Final Office Action in U.S. Appl. No. 16/080,760, dated Jan. 9, 2020.
Final Office Action in U.S. Appl. No. 16/080,739, dated Feb. 7, 2020.
"Bandwidth," Hewlett-Packard Company, 1998, iast retrieved from https://techlibrary.hpe.com/deuce_help/HPJ3298A/utilization.htm?iframe=true&width=80%25&height=100%25 on Jan. 5, 2020. (Year: 1998).
S. Fritsch, A. Senart, D. Schmidt and S. Clarke, "Time-bounded adaptation for automotive system software," 2008 ACM/IEEE 30th International Conference on Software Engineering, Leipzig, 2008, pp. 571-580. (Year: 2008).
F. Malandrino, C. Casetti, C. Chiasserini and M. Fiore, "Optimal Content Downloading in Vehicular Networks," in IEEE Transactions on Mobile Computing, vol. 12, No. 7, pp. 1377-1391, Jul. 2013, (Year: 2013).
Y. Ni, J. He and L. Cai, "Data Dissemination in Software-Defined Vehicular Networks," 2017 IEEE 86th Vehicular Technology Conference (VTC-Fall), Toronto, ON, 2017, pp. 1-5 (Year: 2017).
I.K. Tan, P.K. Hoong and C.Y. Keong, "Towards Forecasting Low Network Traffic for Software Patch Downloads: An ARMA Model Forecast Using CRONOS," 2010 Second International Conference on Computer and Network Technology. Bangkok, 2010, pp. 88-92. (Year: 2019).
Office Action in issued U.S, U.S. Appl. No. 16/080,739, dated May 29, 2020.
Office Action in U.S. Appl. No. 16/306,209, dated Mar. 25, 2020.
Final Office Action in U.S. Appl. No. 16/080,760, dated Aug. 21, 2020.
Final Office Action in U.S. Appl. No. 16/306,209 dated Jul. 13, 2020.
Office Action issued in U.S. Appl. No. 16/080,739, dated Feb. 2, 2021.
Final Office Action in U.S. Appl. No. 16/080,739, dated Oct. 22, 2020.
Office Action issued in U.S. Appl. No. 16/306,209, dated Mar. 16, 2021.

\* cited by examiner

PROGRAM UPDATING SYSTEM, PROGRAM UPDATING METHOD, AND COMPUTER PROGRAM

TECHNICAL FIELD

The present invention relates to a program updating system, a program updating method, and a computer program.

This application claims priority on Japanese Patent Application No. 2016-039917 filed on Mar. 2, 2016, the entire contents of which are incorporated herein by reference.

BACKGROUND ART

For example, Patent Literature 1 and Patent Literature 2 disclose a technique in which a gateway of an on-vehicle communication device or the like receives an update program, from a management server, and an ECU (Electronic Control Unit) overwrites the old version of a control program with the new version of the control program by using the received update program, thereby remotely executing program updating for each ECU in the vehicle through wireless communication.

CITATION LIST

Patent Literature

PATENT LITERATURE 1: Japanese Laid-Open Patent Publication No. 2007-65856
PATENT LITERATURE 2: Japanese Laid-Open Patent Publication No. 2010-198155

SUMMARY OF INVENTION (1) A system according to one aspect of the present disclosure is a program updating system including: a plurality of control devices installed in a vehicle; and a relay device connected to the plurality of control devices so as to be communicable with the control devices within the vehicle. The relay device includes: a wireless communication unit configured to wirelessly receive a plurality of update programs for the control devices; a storage unit configured to store therein the received plurality of update programs; an in-vehicle communication unit configured to transmit the stored plurality of update programs to the corresponding control devices, respectively; and a processing unit configured to execute sequential reception of the update programs in accordance with a communication status of wireless communication, when a total amount of data of the plurality of update programs exceeds a memory capacity for the update programs of the storage unit.

(7) A method according to one aspect of the present disclosure is a program updating method executed by a relay device which is connected to a plurality of control devices installed in a vehicle so as to be communicable with the control devices within the vehicle. The method includes the steps of: wirelessly receiving a plurality of update programs for the control devices; storing the received plurality of update programs; transmitting the stored plurality of update programs to the corresponding control devices, respectively; and determining whether or not sequential reception of the update programs is to be executed, in accordance with a communication status of wireless communication, when a total amount of data of the plurality of update programs exceeds a memory capacity for the update programs of a storage unit.

(8) A computer program according to one aspect of the present disclosure is a computer program for causing a computer to function as a relay device which is connected to a plurality of control devices installed in a vehicle so as to be communicable with the control devices within the vehicle. The computer program includes the steps of: wirelessly receiving a plurality of update programs for the control devices; storing the received plurality of update programs; transmitting the stored plurality of update programs to the corresponding control devices, respectively; and determining whether or not sequential reception of the update programs is to be executed, in accordance with a communication status of wireless communication, when a total amount of data of the plurality of update programs exceeds a memory capacity for the update programs of a storage unit.

DESCRIPTION OF EMBODIMENTS

Problems to be Solved by the Present Disclosure

In Patent Literatures 1 and 2 described above, it is not considered how to cause each of a plurality of ECUs to execute updating of a control program thereof, when the gateway cannot collectively receive update programs for the respective ECUs due to insufficient memory capacity, for example.

Considering the conventional problems described above, an object of the present disclosure is to provide a program updating system, etc., capable of causing each control device to update a control program thereof even when the total amount of data of a plurality of update programs exceeds the memory capacity.

Effect of the Disclosure

According to this disclosure, it is possible to cause each control device to update a control program thereof even when the total amount of data of a plurality of update programs exceeds the memory capacity.

DESCRIPTION OF EMBODIMENTS

Hereinafter, a summary of the present disclosure will be listed and described.

(1) A program updating system according to the present disclosure includes: a plurality of control devices installed in a vehicle; and a relay device connected to the plurality of control devices so as to be communicable with the control devices within the vehicle. The relay device includes: a wireless communication unit configured to wirelessly receive a plurality of update programs for the control devices; a storage unit configured to store therein the received plurality of update programs; an in-vehicle communication unit configured to transmit the stored plurality of update programs to the corresponding control devices, respectively; and a processing unit configured to execute sequential reception of the update programs in accordance with a communication status of wireless communication, in a case where a total amount of data of the plurality of update programs exceeds a memory capacity for the update programs of the storage unit.

According to the program updating system of the present embodiment, when the total amount of data of the plurality of update programs exceeds the memory capacity for the update programs of the storage unit, the processing unit of the relay device executes the sequential reception of the update programs in accordance with the communication status of wireless communication. Therefore, even when the total amount of data of the plurality of update programs exceeds the memory capacity for the update programs, it is possible to cause the control devices to update the control programs.

(2) In the program updating system of the present embodiment, specifically, the processing unit may execute the sequential reception of the update programs when the communication status is good, and may wait until the communication status is improved when the communication status is not good.

(3) In the program updating system of the present embodiment, the processing unit can determine whether or not the communication status is good, based on a received signal strength indication or a bit error rate in the wireless communication unit.

(4) In the program updating system of the present embodiment, when determining whether or not the communication status is good, the processing unit may use the speed of the vehicle as one condition for determining that the communication status is good.

(5) In the program updating system of the present embodiment, the processing unit may determine whether or not the communication status is good, based on the present position of the vehicle.

(6) In the program updating system of the present embodiment, when determining whether or not the communication status is good, the processing unit may use the length of an expected stopping time of the vehicle as one condition for determining that the communication status is good.

(7) A program updating method according to the present embodiment is a program updating method executed by the relay device included in the program updating system according to any one of the above (1) to (6).

Therefore, the program updating method of the present embodiment provides the same operation and effect as in the program updating system according to any one of the above (1) to (6).

(8) A computer program of the present embodiment is a computer program for causing a computer to function as the relay device included in the program updating system according to any one of the above (1) to (6).

Therefore, the computer program of the present embodiment provides the same operation and effect as in the program updating system according to any one of the above (1) to (6).

DETAILED DESCRIPTION OF EMBODIMENT

Hereinafter, an embodiment of the present disclosure will be described with reference to the drawings. At least some parts of the embodiment described below may be combined together as desired.

[Overall Configuration of System]

Figure 1:
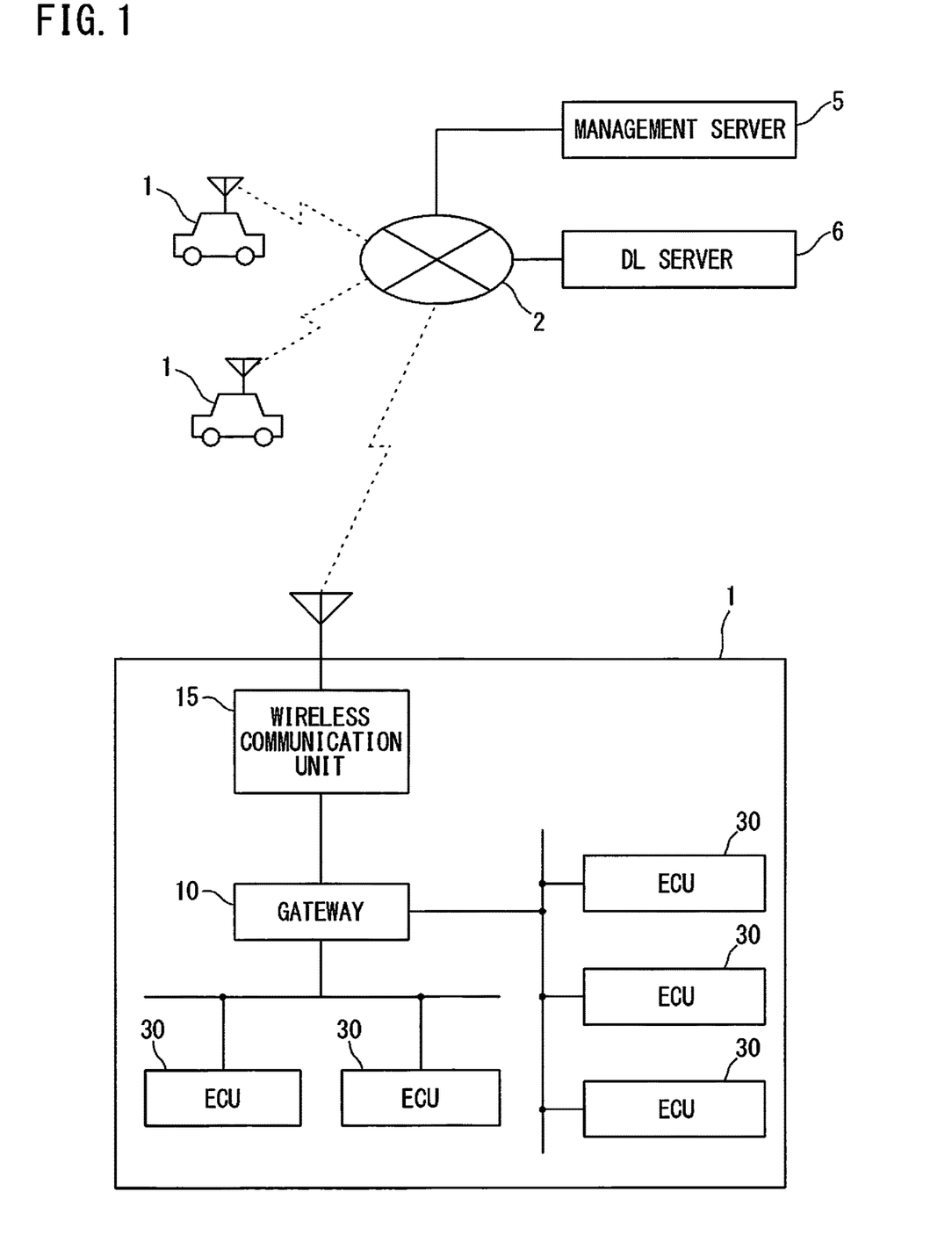
FIG. 1 is a diagram showing an overall configuration of a program updating system according to an embodiment of the present disclosure.

FIG. 1 is a diagram showing an overall configuration of a program updating system according to an embodiment of the present disclosure.

As shown in FIG. 1, the program updating system of this embodiment includes vehicles 1, a management server 5, and a DL (download) server 6 which are able to communicate with each other via a wide-area communication network 2.

The management server 5 and the DL server 6 are operated by, for example, the automobile manufacturer of the vehicles 1, and are able to communicate with large numbers of vehicles 1 owned by users registered as members in advance.

Each vehicle 1 is equipped with a gateway 10, a plurality of ECUs 30, and various on-vehicle devices (not shown) controlled by the respective ECUs 30.

A plurality of communication groups, each being formed by a plurality of ECUs 30 bus-connected to a common in-vehicle communication line, are present in the vehicle 1, and the gateway 10 relays communication between the communication groups. Therefore, a plurality of in-vehicle communication lines are connected to the gateway 10.

The gateway 10 is communicably connected to the wide-area communication network 2 such as a mobile phone network. The gateway 10 transmits, to the ECUs 30, information received from external devices such as the management server 5 and the DL server 6 through the wide-area communication network 2.

The gateway 10 transmits information obtained from the ECUs 30 to the external devices such as the management server 5 through the wide-area communication network 2.

FIG. 1 shows an exemplary case where the gateway 10 directly communicates with the external devices. However, another communication device may be connected to the gateway 10, and the gate way 10 may communicate with the external devices via the other communication device.

Examples of the other communication device connected to the gateway 10 may include a mobile phone, a smart phone, a tablet-type terminal, and a notebook PC (Personal Computer), which are possessed by the user of the vehicle.

In the program updating system shown in FIG. 1, the management server 5 and the DL server 6 are configured as separate servers. However, these serves 5 and 6 may be configured as a single server unit.

[Internal Configuration of Gateway]

Figure 2:
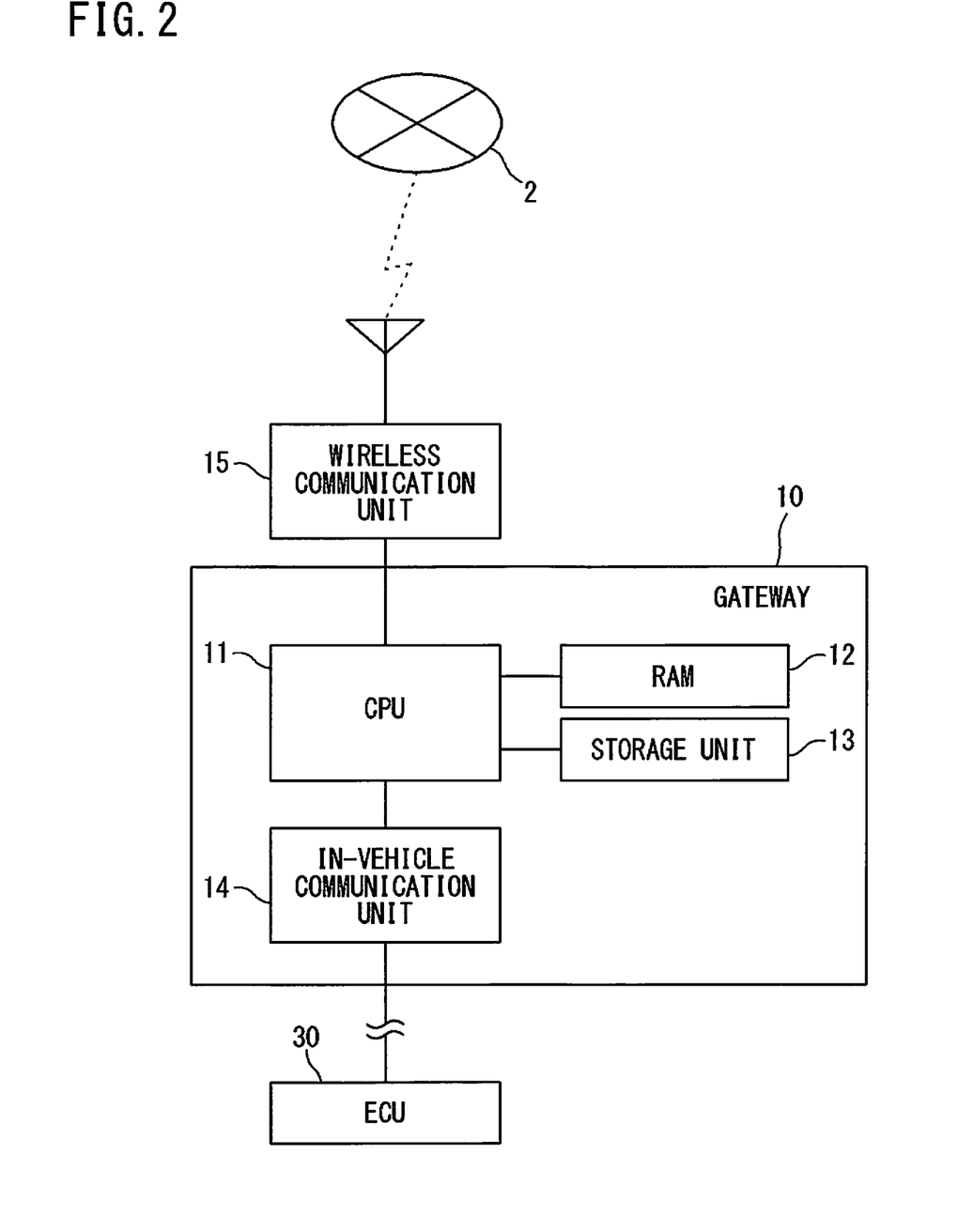
FIG. 2 is a block diagram showing an internal configuration of a gateway.

FIG. 2 is a block diagram showing the internal configuration of the gateway 10.

As shown in FIG. 2, the gateway 10 includes a CPU (Central Processing Unit) 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the plurality of programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program to be executed by the CPU 11 can be transferred in a state of being recorded in a well-known recording medium such as a CD-ROM or a DVD-ROM, or may be transferred by data transmission (download) from a computer device such as a server computer.

In this aspect, the same applies to a computer program to be executed by a CPU 31 of the ECU 30 (refer to FIG. 3) described later, and a computer program to be executed by a CPU 51 of the management server 5 (refer to FIG. 4) described later.

The storage unit 13 consists of, for example, a nonvolatile memory element such as a flash memory or an EEPROM (Electrically Erasable Programmable Read Only Memory).

The storage unit 13 has a storage area in which programs to be executed by the CPU 11, data required in executing the programs, and the like are stored. In the storage unit 13, update programs of the respective ECUs 30, received from the DL server 6, and the like are also stored.

The plurality of ECUs 30 are connected to the in-vehicle communication unit 14 via the in-vehicle communication lines arranged in the vehicle 1. The in-vehicle communication unit 14 communicates with the ECUs 30 in accordance with a standard such as CAN (Controller Area Network), CANFD (CAN with Flexible Data Rate), LIN (Local Interconnect Network), Ethernet (registered trademark), or MOST (Media Oriented Systems Transport: MOST is a registered trademark), for example.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards that are used for an on-vehicle network, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

In the gateway 10, instead of the wireless communication unit 15, a wired communication unit to which another communication device as described above is connected, may be adopted. The wired communication unit has a connector to which a communication device is connected via a communication cable conforming to a standard such as USB (Universal Serial Bus) or RS232C, and performs communication with the other communication device connected thereto via the communication cable.

The wired communication unit transmits information provided from the CPU 11 to the external devices through the other communication device, and provides, to the CPU 11, information received from the external devices via the wide-area communication network 2.

[Internal Configuration of ECU]

Figure 3:
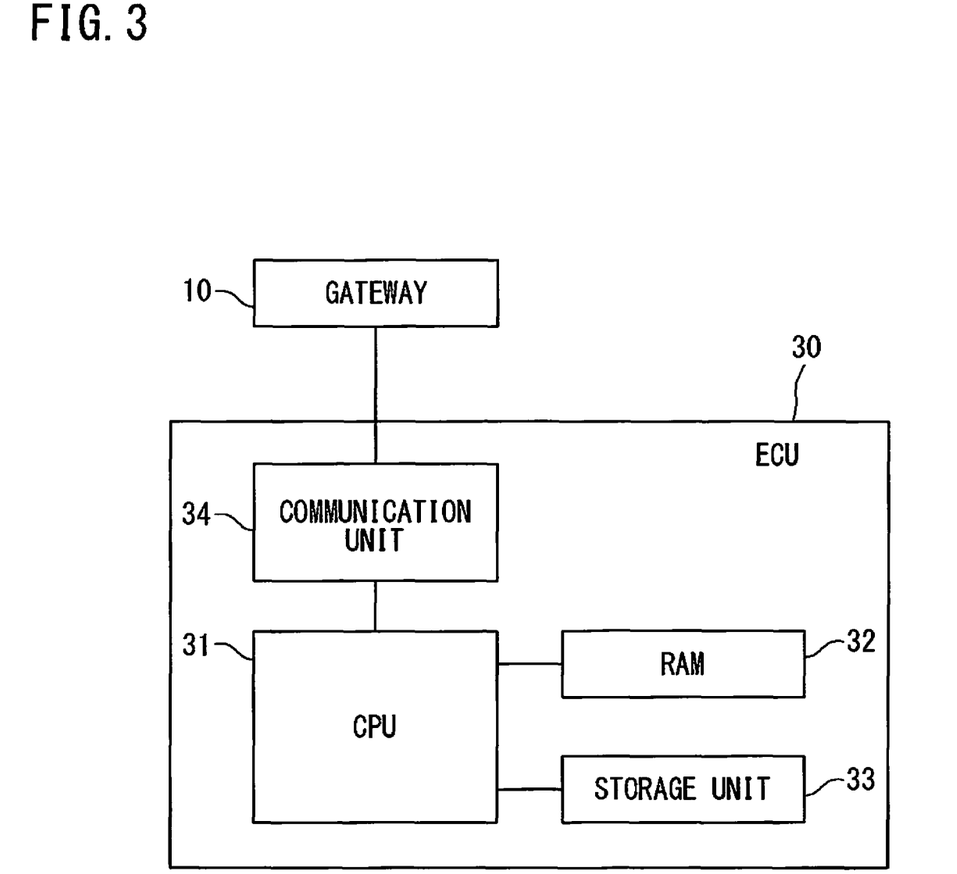
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECUs 30 are control devices that individually control a plurality of on-vehicle devices installed in the vehicle 1. Examples of the types of the ECUs 30 include an engine control ECU, a steering control ECU, and a door lock control ECU.

The CPU 31 controls the operation of an on-vehicle device that the CPU 31 is in charge of, by reading out one or a plurality of programs previously stored in the storage unit 33 to the RAM 32 and executing the read programs. The CPU 31 may also be a CPU representing a plurality of CPU groups, and a control to be performed by the CPU 31 may be a control to be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

Information stored in the storage unit 33 includes, for example, a computer program (hereinafter referred to as "control program") that causes the CPU 31 to execute processing for controlling an on-vehicle device to be controlled.

The gateway 10 is connected to the communication unit 34 via the in-vehicle communication lines arranged in the vehicle 1. The communication unit 34 communicates with the gateway 10 in accordance with a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

[Internal Configuration of Management Server]

Figure 4:
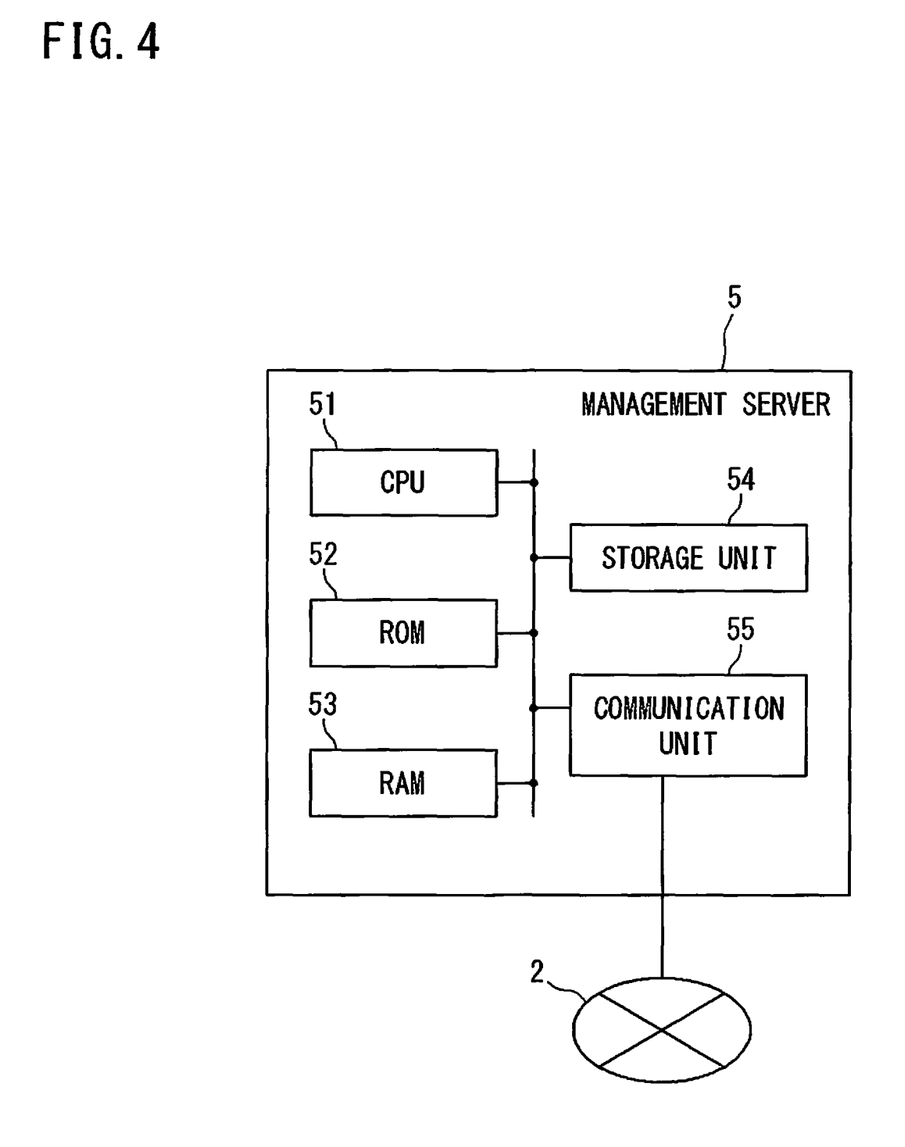
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read programs, the CPU 51 controls the operation of each hardware component, and causes the management server 5 to function as an external device that is able to communicate with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process in accordance with a predetermined communication standard. The communication unit 55 executes the communication process when being connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Sequential Update Processing by Gateway]

Figure 5:
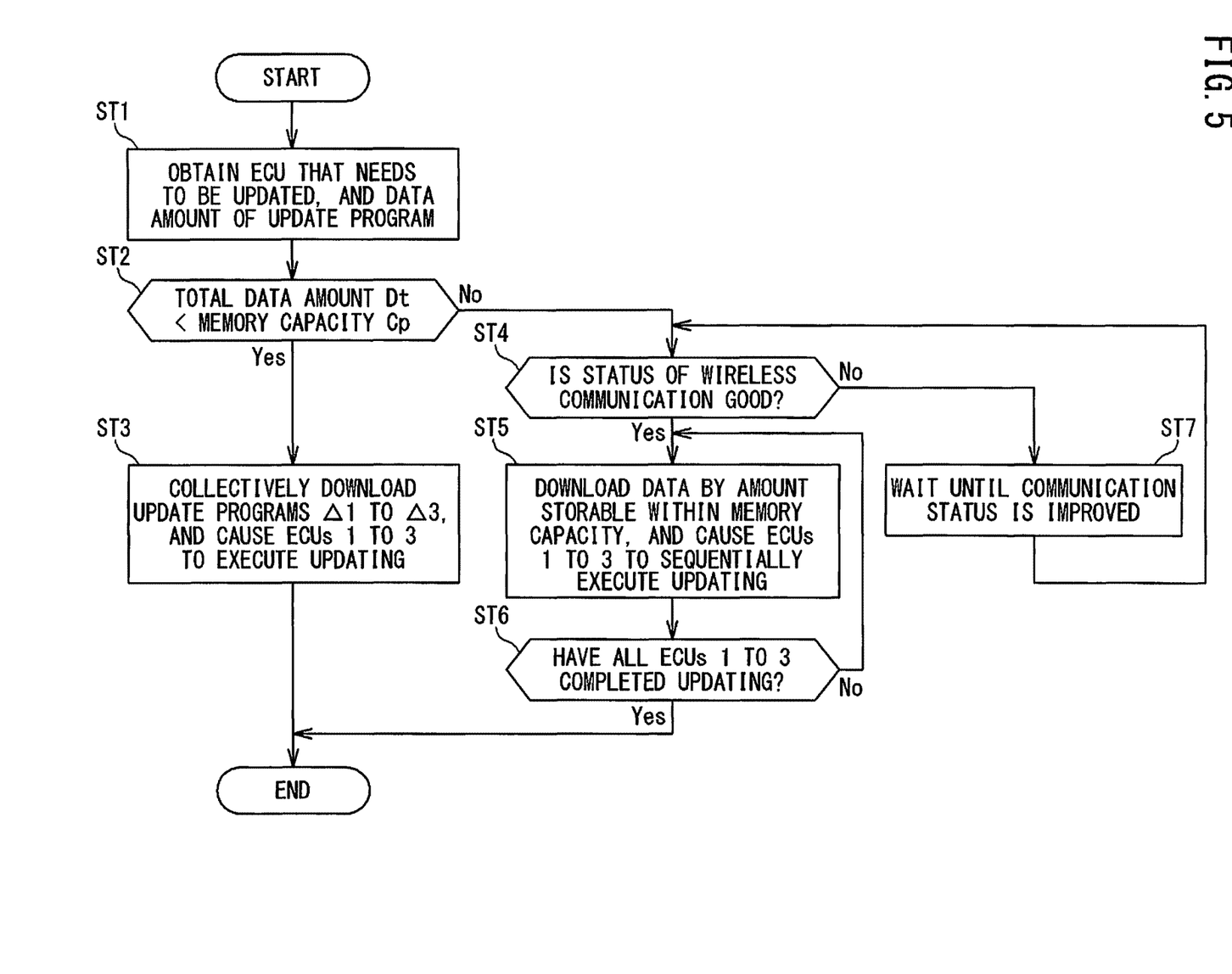
FIG. 5 is a flowchart showing an example of sequential update processing by the gateway.

FIG. 5 is a flowchart showing an example of sequential update processing performed by the gateway 10.

In the following description, a case is assumed in which, among the plurality of ECUs 30 included in the vehicle 1, three ECUs 1 to 3 update control programs thereof by using predetermined update programs.

Although each update program may be a new version of the update program itself, the present embodiment assumes a case in which each update program is a differential program from an old version of the update program.

In addition, the update program of the ECU 1 is represented by "$\Delta 1$", the update program of the ECU 2 is represented by "$\Delta 2$", and the update program of the ECU 3 is represented by "$\Delta 3$".

As shown in FIG. 5, the CPU 11 of the gateway 10 inquires of the management server 5 about the types of ECUs 30 that need to be updated, and about the data amounts of the update programs of the ECUs 30, thereby obtaining these pieces of information from the management server 5 (step ST1).

Here, notification from the management server 5 includes: information that ECUs 30, of the vehicle 1, that need to be updated are the ECUs 1 to 3; and the data amounts of the update programs $\Delta 1$ to $\Delta 3$.

Next, the CPU 11 compares a total value Dt of data amounts of the update programs $\Delta 1$ to $\Delta 3$ with a memory capacity Cp of the storage unit 13 for the update programs, and determines whether or not Dt<Cp is satisfied (step ST2).

When the result of the determination in step ST2 is positive, the CPU 11 collectively downloads all the data of the update programs $\Delta 1$ to $\Delta 3$ from the DL server 6, and causes the ECUs 1 to 3 to execute updating of the respective control programs (step ST3).

Specifically, the CPU 11 causes the in-vehicle communication unit 14 to transmit the update programs $\Delta 1$ to $\Delta 3$ stored in the storage unit 13 to the corresponding ECUs 1 to 3, respectively, and waits until update completion notifications from the ECUs 1 to 3 are received. Upon completion of step ST3, the CPU 11 ends the processing.

When the result of the determination in step ST2 is negative, the CPU 11 determines whether or not the communication status of the wireless communication at the present time is good (step ST4).

The determination whether or not the communication status is good can be performed based on, for example, a received signal strength indication (RSSI) or a bit error rate (BER) in the wireless communication unit 15. When the RSSI is used, the CPU 11 determines that the communication status is good when the RSSI is equal to or greater than a predetermined threshold, whereas it determines that the communication status is not good when the RSSI is less than the threshold.

When the result of the determination in step ST4 is negative, the CPU 11 waits until the communication state is improved (step ST7), and thereafter continues the determination whether or not the communication status is good.

When the result of the determination in step ST4 is positive, the CPU 11 downloads, from the DL server 6, the update programs $\Delta 1$ to $\Delta 3$ by a data amount within the memory capacity, and causes the ECUs 1 to 3 to sequentially execute updating of the control programs (step ST5).

For example, the CPU 11 downloads only one update program $\Delta 1$ and temporarily stores the update program $\Delta 1$ in the storage unit 13, transmits the stored update program $\Delta 1$ to the ECU 1, and waits for update completion notification from the ECU 1.

Next, the CPU 11 determines whether or not the update processes of all the ECUs 1 to 3 have been completed (step ST6). When the result of the determination in step ST6 is positive, the CPU 11 ends the processing. When the result of the determination in step ST6 is negative, the CPU 11 repeatedly executes the process in step ST5.

According to the gateway 10 of the present embodiment, when the total amount Dt of data of the update programs $\Delta 1$ to $\Delta 3$ exceeds the memory capacity Cp, the CPU 11 executes sequential reception of the update programs $\Delta 1$ to $\Delta 3$ in accordance with the communication status in the wireless communication unit 15. Therefore, even when the total amount Dt of data of the plurality of update programs $\Delta 1$ to $\Delta 3$ exceeds the memory capacity, it is possible to cause the ECUs 1 to 3 to update the control programs.

[Other Determination Methods for Communication States of Wireless Communication]

In the gateway 10 of the present embodiment, when determining whether or not the communication status of the wireless communication is good, the CPU 11 may use the speed of the vehicle as one condition for determining that the communication status is good.

In this case, for example, if the vehicle speed is zero (vehicle is at a stop) and the RSSI is equal to or greater than the predetermined threshold, the CPU 11 may determine that the communication status is good and perform sequential reception of the update programs.

In the gateway 10 of the present embodiment, the CPU 11 may determine whether or not the communication status of the wireless communication is good, based on the present position of the vehicle.

In this case, if the present position of the vehicle is near a tunnel or a mountainous area where deterioration of the radio wave reception condition is predicted, the CPU 11 may determine that the communication status is bad, and wait for sequential reception of the update programs.

In the gateway 10 of the present embodiment, when determining whether or not the communication status of the wireless communication is good, the CPU 11 may use the length of an expected stopping time of the vehicle, as one condition for determining that the communication status is good.

In this case, for example, when the doors of the vehicle are locked or the vehicle is being charged, the vehicle is expected to be stopped for a long time. Then, if the RSSI is equal to or greater than the predetermined threshold, the CPU 11 may determine that the radio wave reception condition is good and perform sequential reception of the update programs.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
5 management server
6 DL server
10 gateway (relay device)
11 CPU (processing unit)
12 RAM
13 storage unit
14 in-vehicle communication unit
15 wireless communication unit
30 ECU (control device)
31 CPU
32 RAM
33 storage unit
34 communication unit
51 CPU (processing unit)
52 ROM
53 RAM
54 storage unit
55 communication unit

The invention claimed is:

1. A program updating method executed by a relay device which is connected to a plurality of Electric Control Units (ECUs) installed in a vehicle so as to be communicable with the ECUs within the vehicle, the method comprising the steps of:
wirelessly receiving a plurality of undivided update programs for different types of ECUs, among the plurality of ECUs, that individually control different on-vehicle devices;
storing the received plurality of undivided update programs;
transmitting the stored plurality of undivided update programs to the different types of ECUs, respectively;
determining whether or not a total amount of data of the plurality of undivided update programs for individually operating the different types of the ECUs exceeds a memory capacity for the update programs of a memory;
executing a process and
the process includes sequential reception of the plurality of undivided update programs,
the process includes determining whether or not a communication status of wireless communication is good,
a processor executes the sequential reception of the plurality of undivided update programs when the communication status is good, and waits until the communication status is improved when the communication status is not good,
when determining whether or not the communication status is good, the processor uses a length of an expected stopping time of the vehicle as one condition for determining that the communication status is good, and
the processor determines the length of the expected stopping time of the vehicle based on a locking state of a door lock of the vehicle or a charging state of the vehicle.

2. A program updating system comprising a plurality of Electric Control Units (ECUs) installed in a vehicle, and a relay device connected to the plurality of ECUs so as to be communicable with the ECUs within the vehicle, wherein the relay device comprises:
a wireless communication device to wirelessly receive a plurality of undivided update programs for different types of ECUs, among the plurality of ECUs, that individually control different on-vehicle devices;
a memory to store therein the received plurality of undivided update programs;
an in-vehicle communication device to transmit the stored plurality of undivided update programs to the different types of ECUs, respectively; and
a processor to determine whether or not a total amount of data of the plurality of undivided update programs for individually operating the different types of the ECUs exceeds a memory capacity for the update programs of the memory, wherein
the processor executes a first process when the total amount of data exceeds the memory capacity, and a second process when the total amount of data does not exceed the memory capacity,
the first process includes sequential reception of the plurality of undivided update programs,
the second process includes collective reception of the plurality of undivided update programs,
the first process includes determining whether or not a communication status of wireless communication is good,
the processor executes the sequential reception of the plurality of undivided update programs when the communication status is good, and waits until the communication status is improved when the communication status is not good,
when determining whether or not the communication status is good, the processor uses a length of an expected stopping time of the vehicle as one condition for determining that the communication status is good, and
the processor determines the length of the expected stopping time of the vehicle based on a locking state of a door lock of the vehicle or a charging state of the vehicle.

3. The program updating system according to claim 2, wherein
the processor determines whether or not the communication status is good, based on a received signal strength indication or a bit error rate in the wireless communication device.

4. The program updating system according to claim 2, wherein
when determining whether or not the communication status is good, the processor uses a speed of the vehicle as one condition for determining that the communication status is good.

5. The program updating system according to claim 2, wherein
the processor determines whether or not the communication status is good, based on a present position of the vehicle.

6. A non-transitory computer readable storage medium storing a computer program for causing a computer to function as a relay device which is connected to a plurality of Electric Control Units (ECUs) installed in a vehicle so as to be communicable with the ECUs within the vehicle, the computer program comprising the steps of:
wirelessly receiving a plurality of undivided update programs for different types of ECUs, among the plurality of ECUs, that individually control different on-vehicle devices;

storing the received plurality of undivided update programs;

transmitting the stored plurality of undivided update programs to the different types of ECUs, respectively;

determining whether or not a total amount of data of the plurality of undivided update programs for individually operating the different types of the ECUs exceeds a memory capacity for the update programs of a memory;

executing a first process when the total amount of data exceeds the memory capacity; and executing a second process when the total amount of data does not exceed the memory capacity; wherein the first process includes sequential reception of the plurality of undivided update programs;

the second process includes collective reception of the plurality of undivided update programs, the first process includes determining whether or not a communication status of wireless communication is good, a processor executes the sequential reception of the plurality of undivided update programs when the communication status is good, and waits until the communication status is improved when the communication status is not good, when determining whether or not the communication status is good, the processor uses a length of an expected stopping time of the vehicle as one condition for determining that the communication status is good, and the processor determines the length of the expected stopping time of the vehicle based on a locking state of a door lock of the vehicle or a charging state of the vehicle.

* * * * *